United States Patent
Arapov et al.

(10) Patent No.: US 8,990,627 B2
(45) Date of Patent: Mar. 24, 2015

(54) LEVERAGING PAGE FAULT AND PAGE RECLAIM CAPABILITIES IN DEBUGGING

(75) Inventors: Anton Arapov, Vranov (CZ); Jiri Olsa, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 270 days.

(21) Appl. No.: 13/478,912

(22) Filed: May 23, 2012

(65) Prior Publication Data

US 2013/0318398 A1    Nov. 28, 2013

(51) Int. Cl.
    *G06F 11/00*    (2006.01)
    *G06F 11/36*    (2006.01)

(52) U.S. Cl.
    CPC ................... *G06F 11/362* (2013.01)
    USPC ......................................... 714/38.1

(58) Field of Classification Search
    CPC .............. G06F 11/2294; G06F 11/263; G06F 11/3664; G06F 11/3368; G06F 11/362; G06F 11/3668
    USPC .................................... 714/32, 38.1
    See application file for complete search history.

(56) References Cited

U.S. PATENT DOCUMENTS 7,600,155 B1 * 10/2009 Nickolls et al. ............ 714/38.13

* cited by examiner

*Primary Examiner* — Yair Leibovich
(74) *Attorney, Agent, or Firm* — Lowenstein Sandler LLP

(57) ABSTRACT

An exemplary system may include debug capabilities. In one embodiment, the system obtains a debug address. For a process associated with the system, the system determines whether a memory page used by the process includes the debug address. Upon determining that the memory page used by the process includes the debug address, the system marks the memory page for debug and sends the memory page to a swap area.

20 Claims, 5 Drawing Sheets

LEVERAGING PAGE FAULT AND PAGE RECLAIM CAPABILITIES IN DEBUGGING

TECHNICAL FIELD

Embodiments of the present invention relate to debugging applications, and more particularly, to a technique for leveraging page fault and page reclaim capabilities in debugging applications.

BACKGROUND

Most modern computing systems, such as desktops and servers, include tools to allow a user to debug a user application on the computing system. Some debug tools enable a user to dynamically break into any routine in a user application and collect debugging and performance information non-disruptively.

A common debug tool can allows a user to insert probes, such as uprobes, on any instruction in an application's virtual address space. The user provides a file, such as an executable or a library, and an offset within the file to define an address. The debug tool can iterate through the processes currently running on the computing system to determine if the computing system is using the file. When the file is found within a running process, the instruction in the file at the defined address can be replaced with a breakpoint instruction (e.g., TRAP instruction), and the original bytes (the instruction at the defined address) can be saved. The running processes can be checked, and the corresponding files for the running processes including the provided file can be updated. When a central processing unit (CPU) in the computing system hits the provided address, a trap can occurs, the debug tool can be triggered, and a registered callback can be run.

However, this type of debug tool typically consumes memory, since the original bytes for all processes using the file are copied. If many processes use the file, a significant amount of memory can be used. Moreover, if a process never hits the breakpoint instruction, the original bytes for that process can be stored unnecessarily. In addition, storing the original bytes for all processes is time consuming. Furthermore, specialized code may be required for registering the trap, and turning off the debugging capabilities for an application may require restoring the memory pages to their original state by loading the stored original bytes for each memory page used by each process associated with the application.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Figure 1:
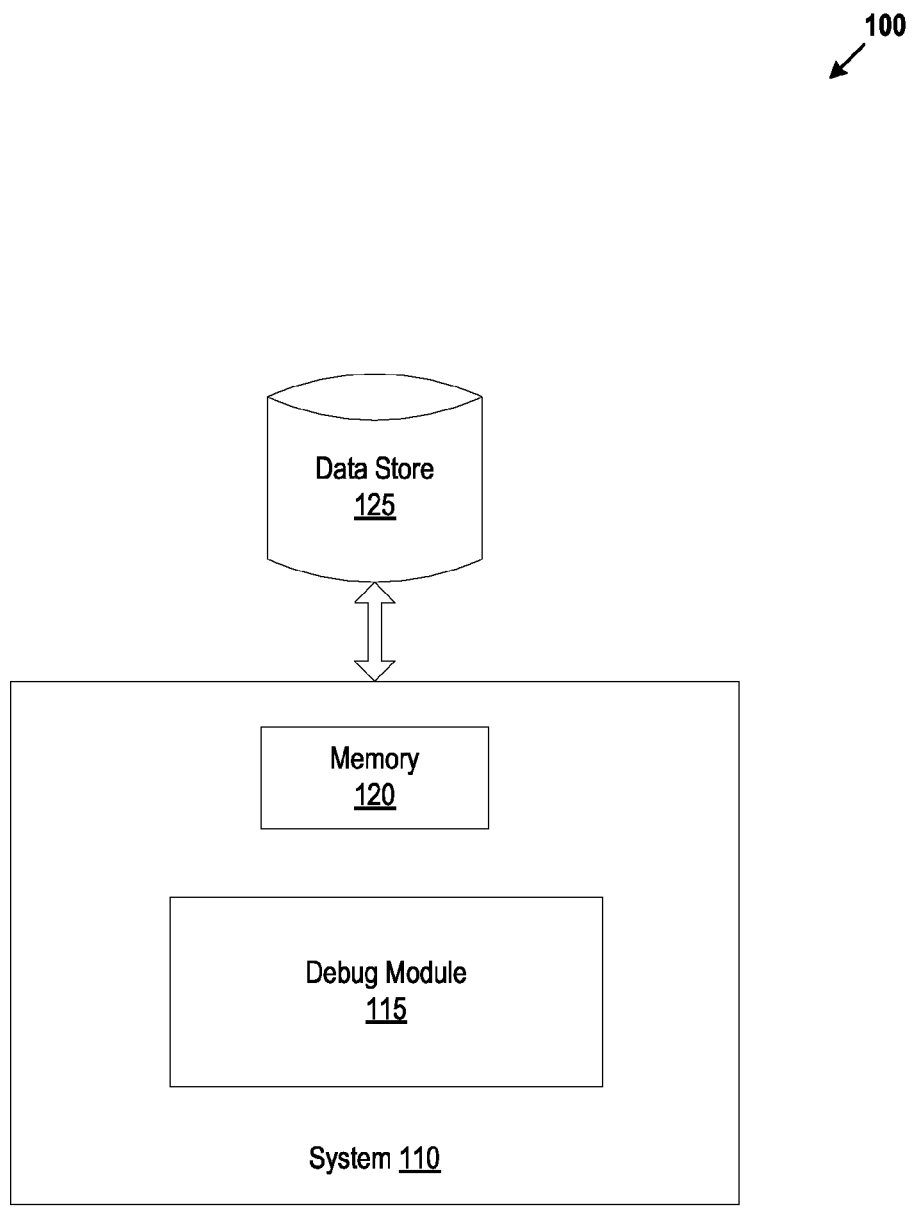
FIG. 1 illustrates exemplary system architecture, in accordance with various embodiments of the present invention.

Embodiments of the invention are directed to a method and system for leveraging page fault and page reclaim capabilities in debugging.

A debug tool can enable a user to dynamically break into any routine in a user application and collect debugging and performance information non-disruptively. Prior to debugging a user application, the debug tool can obtain a debug address. The debug address can represent an address or instruction where a user would like to stop the application to collect information. The information can pertain to the performance of the application, to an issue being experienced by a user of the application, etc. The debug tool can iterate through each process in the computing system to determine whether a memory page used by the process includes the debug address. If the debug tool determines that the memory page does not include the debug address, the debug tool can move onto the next process. If the debug tool determines that the memory page includes the debug address, the debug tool can mark the page for debugging purposes and can send the memory page to a swap area.

In one embodiment, once all the processes have been iterated through, the application can begin running with the debug capabilities turned on. If a memory page that the application needs is not in a memory (e.g., Random Access Memory (RAM)) of the computing system, a page fault can occur to obtain the memory page from the swap area. The page fault is processed and the memory page is loaded into memory (e.g., RAM). Upon obtaining the memory page, the debug tool can determine whether the memory page is marked for debugging purposes. If the memory page is marked for debugging purposes, the bytes of the instruction at the debug address can be saved and the instruction can be replaced with a breakpoint instruction.

As a result, the debug tool does not copy and store the original bytes of the memory page, and does not insert a breakpoint instruction for memory pages including the debug address as the debug tool iterates through the processes. Instead, the debug tool marks and swaps out memory pages that match the debug address as the debug tool iterates through the processes. Therefore, less processing is required for processes that include, but do not use, the debug address because the bytes of the memory page and insertion of the breakpoint instruction occur once the memory page is swapped in from memory while the application is running, rather than while the debug tool iterates through the processes. Moreover, there is lower memory consumption because the original bytes of a memory page are not copied until the memory page is swapped in from memory. In addition, the debug tool can use existing code for page faults and page reclaims, rather than generating new debug-specific code for these operations. Furthermore, to unregister the debugging for the debug tool, the marks on the memory pages marked for debugging purposes can be cleared, without having to restore the memory pages to their original state by obtaining the stored original bytes for the memory pages.

FIG. 1 illustrates an exemplary system 100 in which embodiments can be implemented. System 100 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the invention may operate within a single computing device or on multiple computing devices.

Data store 125 can be hosted by one or more writable persistent storage devices, such as memories, tapes or disks. In one embodiment, the one or more writable persistent storage devices are not Random Access Memory (RAM) devices, and can include devices such as hard drives, tapes, magnetic disks, optical disks, etc.

Although each of system 100 and data store 125 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

The data in the data store 125 can include data related to the system 100. Examples of data related to the system 100 can include, and are not limited to, memory pages used by applications running on system 100, and any other electronically stored information that can be associated with a system, etc.

During operation of the system 100, the system 100 can have many processes executing on it, spawned by one or more applications that a user may want to debug. In one embodiment, the system 100 can include a debug module 115 and a memory 120.

The debug module 115 can determine a debug address. The debug address can represent an address or instruction that an application should stop while in a debug mode. In one embodiment, the debug address is determined by receiving the debug address as input from a user. In an alternate embodiment, the debug address is calculated based on user input.

The debug module 115 can obtain process information about the processes running on system 100. For each process in the process information, the debug module 115 can determine whether a memory page in memory 120 that is used by the process includes the debug address. If the memory page used by the process includes the debug address, debug module 115 can mark the memory page for debug and send the memory page to a swap area. In one embodiment, debug module 115 marks the memory page for debug by changing a predefined bit in the memory page, such as a debug flag or bit. In one embodiment, the swap area is an area in data store 125. In one embodiment, the swap area is memory that is external to memory 120. In one embodiment, the swap area is memory that is not Random Access Memory.

Once the debug module 115 has iterated through the processes, the application can be run with debug capabilities turned on. While the application is running, the debug module 115 can obtain a memory page from data store 125 in response to a page fault for the memory page. In one embodiment, the debug module 115 the page fault occurs because the memory page was needed by the application and was not in memory 120. The debug module 115 can determine whether the memory page is marked for debug by checking whether a debug flag or bit is set for the memory page. If the memory page is marked for debug, the debug module 115 can store the bytes of the instruction at the debug address in memory (e.g., in memory 120 or data store 125), and can replace the instruction at the debug address with a breakpoint instruction (e.g., TRAP instruction).

Figure 2:
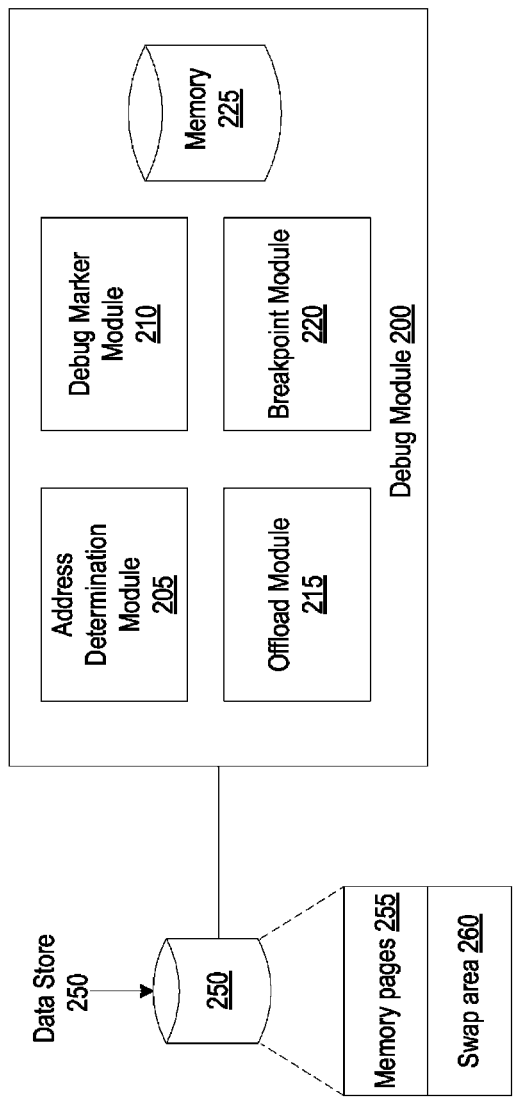
FIG. 2 is a block diagram of a debug module, in accordance with an embodiment.

FIG. 2 is a block diagram of a debug module 200, in accordance with one embodiment of the present invention. The debug module 200 includes an address determination module 205, a debug marker module 210, an offload module 215, a breakpoint module 220, and a memory 225. Note that in alternative embodiments, the functionality of one or more of the address determination module 205, the debug marker module 210, the offload module 215, the breakpoint module 220, and the memory 225 may be combined or divided.

Address determination module 205 can determine a debug address and obtain process information for a computing system. In one embodiment, the debug address is an address or instruction at which an application being debugged should stop running. In one embodiment, the debug address is determined by obtaining the debug address from a predefined location in memory (e.g., memory 225). In an alternate embodiment, the debug address is determined by receiving the debug address from a user through a user interface. In an alternate embodiment, the debug address is determined by receiving the debug address from an application in a debug mode. In one embodiment, the process information is obtained from an operating system (not shown), and includes processes that are currently executing in the system.

Debug marker module 210 can determine whether a memory page used by a process executing in the system includes the debug address. Debug marker module 210 can access each memory page used or associated with the process, and read the addresses in each memory page. In one embodiment, debug marker module 210 accesses each memory page by reading each memory page in memory pages 255, and bringing each memory page into memory 225. If an address in a memory page matches the debug address, debug marker module 210 can mark the memory page for debug (e.g., using a debug flag or bit for the memory page).

Offload module 215 can offload the marked memory page to a swap area. In one embodiment, the swap area is swap area 260 in data store 250. In one embodiment, swap area 260 is memory that is not RAM.

Breakpoint module 220 can obtain a memory page from swap area 260 in response to a page fault for the memory page. In one embodiment, the page fault is caused by an application accessing a memory page that is mapped in the application's virtual address space, but not loaded in physical memory. In an alternate embodiment, the page fault is caused by an application accessing a miss for the memory page in a local memory (e.g., cache or RAM). In one embodiment, breakpoint module 220 can store the memory page in memory 225.

Breakpoint module 220 can determine whether the memory page is marked for debug by accessing a debug indicator associated with the memory page. If the memory page is marked for debug, breakpoint module 220 can make a copy of a portion of the memory page that corresponds to the debug address determined by address determination module 205. In one embodiment, the copy of the portion of the memory page is stored in memory 225. In an alternate embodiment, the copy of the portion of the memory page is stored in data store 250. Breakpoint module 220 can then modify the memory page by overwriting an instruction at the debug address with a breakpoint instruction (e.g., TRAP instruction).

Figure 3:
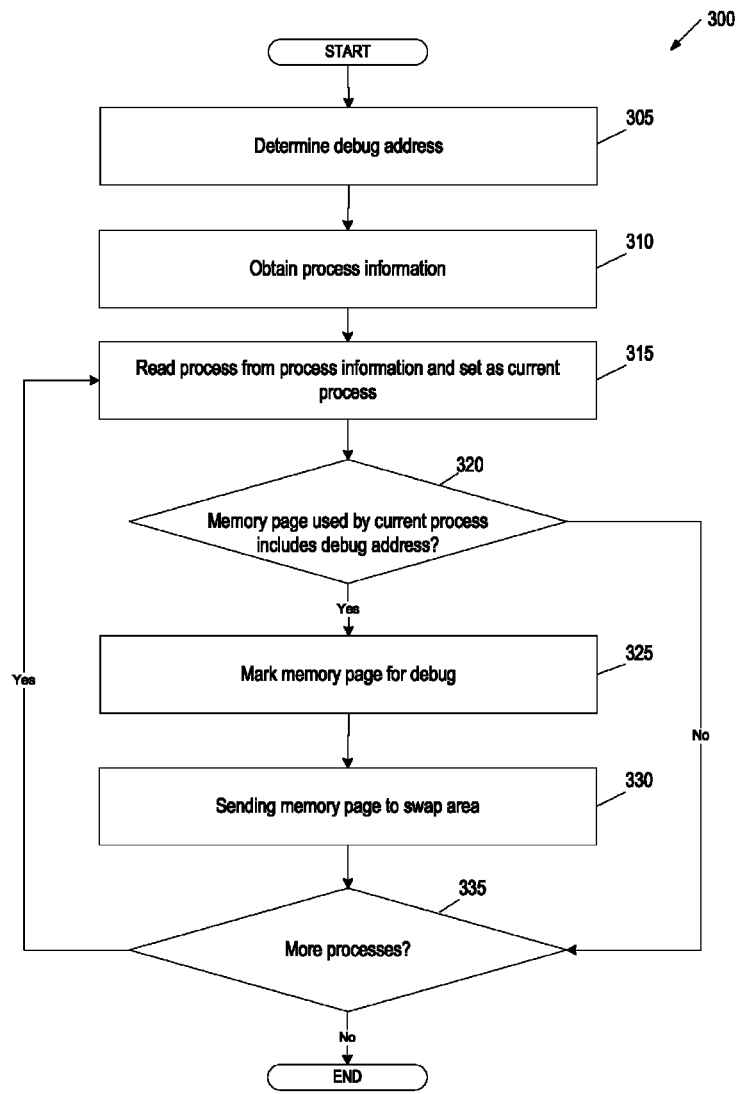
FIG. 3 is a flow diagram illustrating an embodiment for a method of leveraging page fault and page reclaim capabilities in debugging, in accordance with an embodiment.

FIG. 3 is a flow diagram of an embodiment of a method 300 for method of a method of leveraging page fault and page reclaim capabilities in debugging. The method 300 is performed by processing logic that may comprise hardware (circuitry, dedicated logic, etc.), software (such as is run on a general purpose computer system or a dedicated machine), or a combination of both. In one embodiment, the method 300 is performed by the debug module 200 of FIG. 2.

At block 305, processing logic determines a debug address. In one embodiment, the debug address is an address or instruction at which an application being debugged should stop running. In one embodiment, the debug address is determined by obtaining the debug address from a predefined location in memory. The debug address can represent an executable file or library file used by one or more applications on a system. In an alternate embodiment, the debug address is determined by receiving the debug address from a user through a user interface. In an alternate embodiment, the debug address is determined by receiving the debug address from an application in a debug mode.

At block 310, processing logic obtains process information for the system. In one embodiment, process information is obtained by accessing a predefined location in a memory associated with the system. In an alternate embodiment, the process information is obtained by submitting a request to an operating system (e.g., Linux® operating system, Windows® operating system, etc.) running on the system and receiving the resource information from the operating system. In another alternate embodiment, the process information is obtained from the operating system by using an API to read the processes from the operating system. The process information can include a list of processes that are currently executing in the system (e.g., all processes). In one embodiment, the process information includes one or more memory pages accessed by each process listed in the process information.

At block 315, processing logic reads a process from the process information and sets that process as the current process.

At block 320, processing logic determines whether one or more memory pages used by the process include the debug address. Processing logic can determine whether a memory page used by the process includes the debug address by bringing each memory page accessed by the process into memory, reading the addresses in each memory page, and comparing each address to the debug address. In one embodiment, processing logic brings each memory page accessed by the process into RAM. If none of the addresses in the memory pages for a process match the debug address, processing logic can determine that a memory page used by the process does not include the debug address, and the method proceeds to block 335. If at least one address in at least one memory page matches the debug address, processing logic can determine that a memory page used by the process includes the debug address, and the method proceeds to block 325.

At block 325, processing logic marks each memory page that includes the debug address with a debug indicator. In one embodiment, the debug indicator is a single bit in the memory page. In an alternate embodiment, the debug indicator is a flag that is associated with the memory page.

At block 330, processing logic sends the memory page to a swap area. In one embodiment, processing logic sends the memory page to a swap area by storing the memory page to persistent memory (e.g., non-RAM memory). Examples of non-RAM memory can include a hard drive, tape, magnetic disk, optical disks, etc.

At block 335, processing logic determines whether there are more processes in the process information that have not been analyzed for the debug address. If there is a process in the process information that has not been analyzed, the method 300 returns to block 315 to read the next process and analyze it. If all the processes have been analyzed, the method 300 ends.

Figure 4:
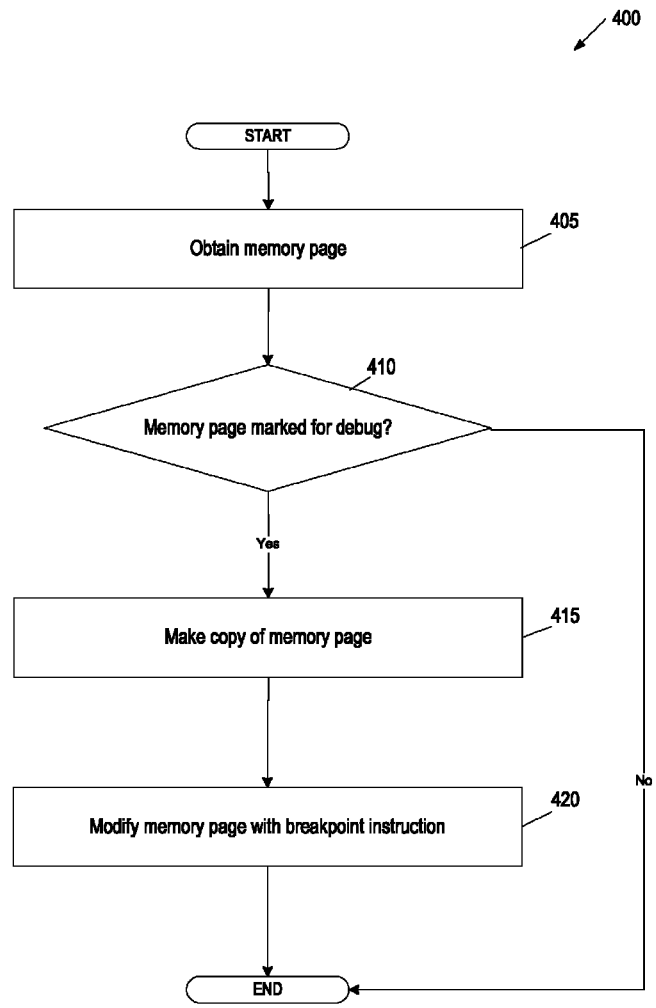
FIG. 4 is a flow diagram illustrating an embodiment for updating memory pages during debugging, in accordance with an embodiment.

FIG. 4 is a flow diagram of an embodiment of a method 400 for method of a method of updating memory pages during debugging. The method 400 is performed by processing logic that may comprise hardware (circuitry, dedicated logic, etc.), software (such as is run on a general purpose computer system or a dedicated machine), or a combination of both. In one embodiment, the method 400 is performed by the debug module 200 of FIG. 2.

At block 405, processing logic obtains a memory page during debugging of a process. In one embodiment, processing logic obtains the memory page in response to the process requesting access to the memory page that results in a page fault. In an alternate embodiment, processing logic obtains the memory page in response to the memory page not being found in a RAM memory (e.g., cache miss, etc.). In one embodiment, processing logic obtains the memory page from a swap area, which is memory that is not RAM memory.

At block 410, processing logic determines whether the memory page includes a debug indicator. In one embodiment, processing logic determines whether the memory page includes a debug indicator by reading a predefined bit in the memory page. If the bit is set (e.g., 1), processing logic can determine the memory page includes the debug indicator. If the bit is not set (e.g., 0), processing logic can determine the memory page does not include the debug indicator. In an alternate embodiment, processing logic determines whether the memory page includes a debug indicator by reading a flag associated with the memory page. If the flag is set (e.g., 1), processing logic can determine the memory page includes the debug indicator. If the flag is not set (e.g., 0), processing logic can determine the memory page does not include the debug indicator. If processing logic determines that the memory page does not include the debug indicator, the method 400 ends. If processing logic determines that the memory page does include the debug indicator, the method 400 proceeds to block 415.

At block 415, processing logic makes a copy of the memory page. In one embodiment, only the bytes of an instruction at a debug address are copied. In an alternate embodiment, the entire memory page is copied. In one embodiment, processing logic stores the copied bytes in memory, such as RAM.

At block 420, processing logic modifies the memory page with a breakpoint instruction. In one embodiment, processing logic modifies the memory page with a breakpoint instruction by overwriting the bytes of the instruction at the debug address with the breakpoint instruction. In an alternate embodiment, processing logic modifies the memory page with a breakpoint instruction by inserting the breakpoint instruction before or after the instruction at the debug address. Examples of a breakpoint instruction include a trap instruction, int 3 instruction, ptrace, etc.

Figure 5:
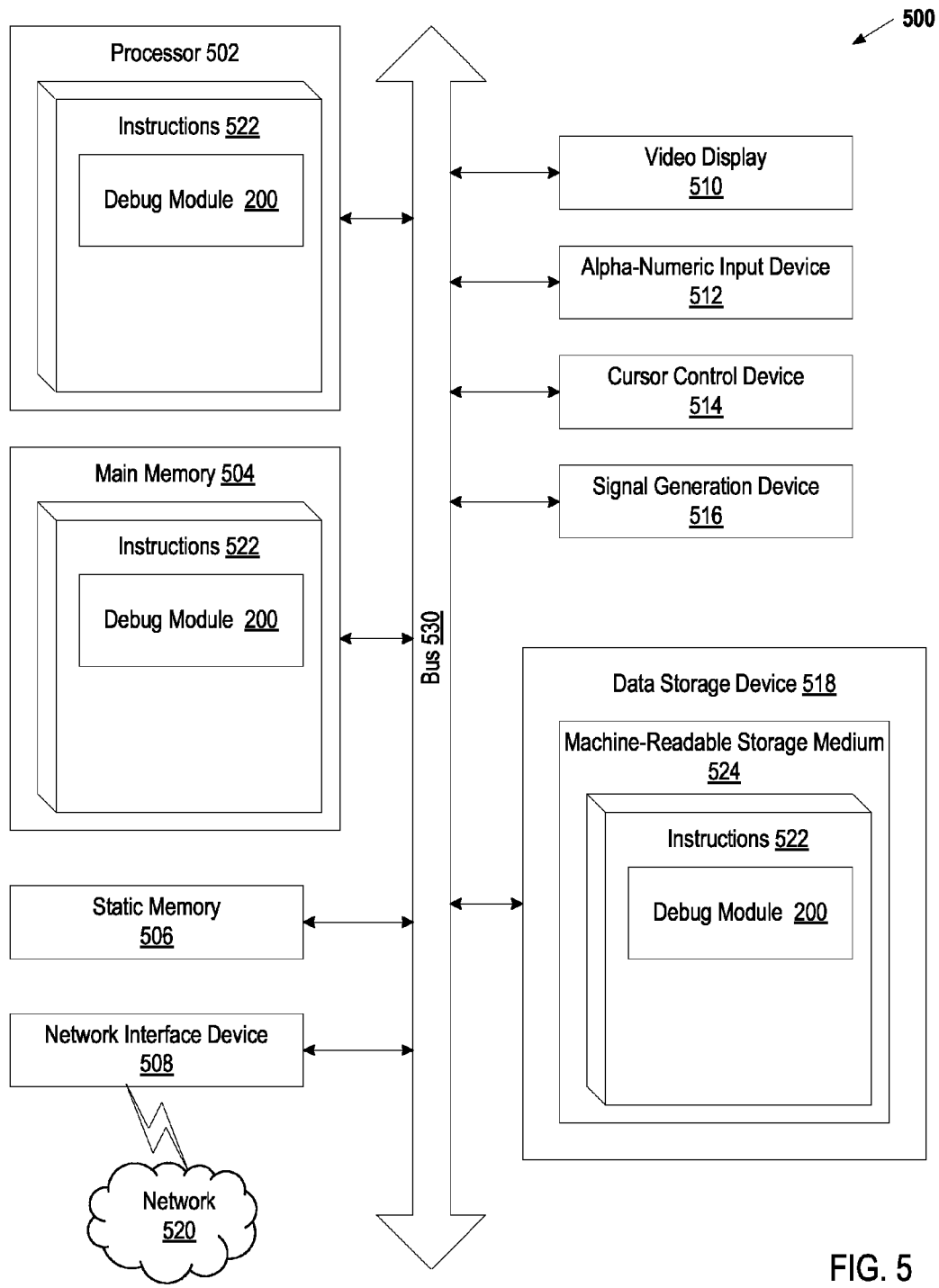
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 520 via the network interface device 522.

In one embodiment, the instructions 526 include instructions for a debug module 200, and/or a software library containing methods that leverage page fault and page reclaim capabilities in debugging. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:
1. A method comprising:
   obtaining, by a processing device, a debug address;
   for a process associated with the computing system:
      determining, by the processing device, whether a memory page used by the process includes the debug address, upon determining that the memory page used by the process includes the debug address:
  marking, by the processing device, the memory page for debug; and
  sending, by the processing device, the memory page to a swap area.

2. The method of claim 1, wherein the swap area is a non-Random Access Memory (RAM).

3. The method of claim 1, wherein determining whether a memory page used by the process includes the debug address comprises:
  comparing a memory address of the memory page to the debug address;
  determining that the memory page includes the debug address if the comparison is positive; and
  determining that the memory page does not include the debug address if the comparison is negative.

4. The method of claim 1, wherein marking the memory page for debug comprises:
  inserting an indicator in the memory page without copying the memory page.

5. The method of claim 1, wherein the marking and the sending of the memory page is performed without inserting a debug instruction and after obtaining the memory page from the swap area the memory page is modified to include the debug instruction.

6. A method comprising:
  determining, by the processing device, whether a memory page loaded into memory comprises a debug marking;
  after determining that the memory page comprises the debug marking:
    generating, by the processing device, a copy of an instruction at a debug address in the memory, and
    modifying, by the processing device, the memory page to include a debug instruction.

7. The method of claim 6, further comprising:
  loading the memory page from a swap area to the memory in response to a page fault.

8. A non-transitory computer readable storage medium having instructions that, when executed by a processing device, cause the processing device to perform operations comprising:
  obtaining, by the processing device, a debug address;
  for a process associated with the processing device:
    determining whether a memory page used by the process includes the debug address,
    upon determining that the memory page used by the process includes the debug address:
      marking, by the processing device, the memory page for debug; and
      sending, by the processing device, the memory page to a swap area.

9. The non-transitory computer readable storage medium of claim 8, wherein determining whether a memory page used by the process includes the debug address comprises:
  comparing a memory address of the memory page to the debug address;
  determining that the memory page includes the debug address if the comparison is positive; and
  determining that the memory page does not include the debug address if the comparison is negative.

10. The non-transitory computer readable storage medium of claim 8, wherein marking the memory page for debug comprises:
  inserting an indicator in the memory page without copying the memory page.

11. A non-transitory computer readable storage medium of claim 8, further comprising:
  determining, by the processing device, whether the memory page loaded into memory comprises a debug marking;
  after determining that the memory page comprises the debug marking:
    generating, by the processing device, a copy of an instruction at a debug address in the memory page, and
    modifying, by the processing device, the memory page to include a debug instruction.

12. The non-transitory computer readable storage medium of claim 8, wherein the marking and the sending of the memory page is performed without inserting a debug instruction and after obtaining the memory page from the swap area the memory page is modified to include the debug instruction.

13. The non-transitory computer readable storage medium of claim 11, having instructions that, when executed by a processing device, cause the processing device to perform operations further comprising:
  loading the memory page from a swap area of memory in response to a page fault.

14. A computing device comprising:
  a memory; and
  a processing device coupled to the memory, wherein the processing device is to:
    obtain a debug address;
    for a process associated with the computing system:
      determine whether a memory page used by the process includes the debug address,
      upon determining that the memory page used by the process includes the debug address:
        mark the memory page for debug; and
        send the memory page to a swap area.

15. The computing device of claim 14, wherein to determine whether a memory page used by the process includes the debug address, the processing device to:
  compare a memory address of the memory page to the debug address;
  determine that the memory page includes the debug address if the comparison is positive; and
  determine that the memory page does not include the debug address if the comparison is negative.

16. The computing device of claim 14, wherein to mark the memory page for debug, the processing device is further configured to:
  insert an indicator in the memory page without copying the memory page.

17. A computing device of claim 14,
  wherein the processing device is further configured to:
    determine whether the memory page loaded into memory comprises a debug marking;
    after determining that the memory page comprises the debug marking:
      generate a copy of an instruction at a debug address in the memory page, and
      modify the memory page to include a debug instruction.

18. The computing device of claim 14, wherein the marking and the sending of the memory page is performed without inserting a debug instruction and after obtaining the memory page from the swap area the memory page is modified to include the debug instruction.

19. The computing device of claim 17, wherein the processing device is further configured to:

load the memory page from a swap area of memory in response to a page fault.

20. The computing device of claim 19, further comprising a non-Random Access Memory (RAM), and wherein the swap area is included in the non-RAM.

* * * * *